(12) United States Patent
Calabro et al.

(10) Patent No.: US 9,106,345 B2
(45) Date of Patent: Aug. 11, 2015

(54) OPTICAL COMMUNICATION APPARATUS AND METHOD

(75) Inventors: Stefano Calabro, Munich (DE); Bernhard Spinnler, Oberhaching (DE)

(73) Assignee: Xieon Networks S.a.r.l., Luxembourg (LU)

( * ) Notice: Subject to any disclaimer, the term of this patent is extended or adjusted under 35 U.S.C. 154(b) by 14 days.

(21) Appl. No.: 13/977,236

(22) PCT Filed: Dec. 30, 2010

(86) PCT No.: PCT/EP2010/070907
§ 371 (c)(1),
(2), (4) Date: Jul. 16, 2013

(87) PCT Pub. No.: WO2012/089266
PCT Pub. Date: Jul. 5, 2012

(65) Prior Publication Data
US 2014/0003822 A1    Jan. 2, 2014

(51) Int. Cl.
*H04B 10/516* (2013.01)
*H04B 10/2569* (2013.01)
*H04B 10/61* (2013.01)

(52) U.S. Cl.
CPC .......... *H04B 10/616* (2013.01); *H04B 10/2569* (2013.01); *H04B 10/516* (2013.01)

(58) Field of Classification Search
CPC .................................................. H04B 10/2569
USPC ........................................................ 398/159
See application file for complete search history.

(56) References Cited

U.S. PATENT DOCUMENTS

2004/0223521 A1*  11/2004  Brandon et al. ................... 372/3

FOREIGN PATENT DOCUMENTS

CN    101834672 A    9/2010

OTHER PUBLICATIONS

Chunpo Pan and Frank R. Kschischang, Differential Polarization Time Coding for PoIDM Systems without PMD Compensator,Mar. 10, 2010 I EEE,242-244.*
Maxim Kuschnerov, DSP for Coherent Single-Carrier Receivers,Journal of Ligh-I-Wave Technology, vol. 27, No. 16, Aug. 15, 2009, pp. 3614-3620.*
Sander L. Jansen,Coherent Optical 25.8-Gb/s OFDM Transmission Over 4160-km SSMF,Journal of Lightwave Technology, vol. 26, No. 1, Jan. 1, 2008, pp. 6-9.*

(Continued)

*Primary Examiner* — David Payne
*Assistant Examiner* — Omar S Ismail
(74) *Attorney, Agent, or Firm* — Nelson Mullins Riley & Scarborough LLP

(57) ABSTRACT

An apparatus for optical communication and optical communication method are provided, the method comprising the steps of generating an optical signal for transmitting the sequence of information data, transmitting the sequence of information data as a sequence of transmit matrices, S(k) being the k-th transmit matrix and k being a positive integer, and wherein the sequence of transmit matrices is transmitted through an optical channel characterized by a unitary channel matrix H, receiving a sequence of receive matrices, the k-th receive matrix R(k) being expressed as: R(k)=H·S(k)+N(k) wherein k is a positive integer and N(k) is a complex matrix of noise samples and providing a sequence of decision matrices, the k-th decision matrix D(k) being expressed as: D(k)=$R^H$(k−1)R(k).

13 Claims, 6 Drawing Sheets

(56) References Cited

OTHER PUBLICATIONS

Chunpo Pan et al., "Differential Polarization Time Coding for PolDM Systems without PMD Compensator", Communications (QBSC), 2010, 25th Biennial Symposium on Communications, IEEE, Piscataway, NJ, USA, May 12, 2010, pp. 242-245, XP031681230.

Giulio Covavolpe et al., "Robust Multilevel Coherent Optical Systems With Linear Processing at the Receiver", Journal of Lightwave Technology, IEEE Service Center, New York, US, vol. pp, No. 13, Jul. 1, 2009, pp. 2357-2369, XP011255995.

Chris Fludger et al., "Coherent Equalization and POLMUX-RZ-DQPSK for Robust 100-GE Transmission", IEEE/OSA, Journal of Lightwave Technology, vol. 26, No. 1, Jan. 1, 2008.

Maxim Kuschnerov et al., "DSP for Coherent Single-Carrier Receivers", IEEE/OSA, Journal of Lightwave Technology, vol. 27, No. 16, Aug. 15, 2009.

Sander Jansen et al., Long-haul transmission of 16×52.5 Gbits/s polarization-division-multiplexed OFDM enabled by MIMO processing (Invited), Journal of Optical Networking, vol. 7, No. 2, Feb. 2008.

Michael Taylor et al. "Phase Estimation Methods for Optical Coherent Detection Using Digital Signal Processing", IEEE/OSA, Journal of Lightwave Technology, vol. 27, No. 7, Apr. 1, 2009.

Sander Jansen et al., Coherent Optical 25.8-Gb/s OFDM Transmission Over 4160-km SSMF, IEEE/OSA Journal of Lightwave Technology, vol. 26, No. 1, Jan. 1, 2008.

Chinese Office Action, Chinese Application No. 201080071263.1, dated Apr. 3, 2015, 25 pages.

* cited by examiner

OPTICAL COMMUNICATION APPARATUS AND METHOD

RELATED APPLICATIONS

This application is a 35 U.S.C. 371 national stage filing of International Application No. PCT/EP2010/070907, filed on Dec. 30, 2010. The contents of the aforementioned application is hereby incorporated by reference.

FIELD OF THE INVENTION

The invention refers to method and an apparatus for signal processing in a communication system (e.g. an optical communication system).

BACKGROUND OF THE INVENTION

Optical fiber communication is continuously experiencing the pressure of fast growing data traffic. To target the threatening capacity crunch, the communications industry is forced to upgrade and extend the existing networks. A promising enhancement possibility is the use of advanced modulation formats.

Whereas conventional optical transmission systems employ binary signalling, advanced systems rely upon high-order constellations and Polarization Division Multiplexing (PDM). These techniques improve the spectral efficiency thereby supporting the transmission of higher data rates within the same bandwidth occupied by traditional On-Off Keying (OOK) channels.

Single-carrier and Orthogonal Frequency-Division Multiplexing (OFDM) systems are well known conventional techniques. Although single-carrier PDM Quaternary Phase-Shift Keying (QPSK) is emerging as the dominant transmission scheme for the first generation of 100G systems, a clear solution for the next generations has not prevailed yet.

Generally, for the advanced modulation formats coherent receivers replace traditional direct detection receivers. By implementing a linear mapping of the optical signal into the electrical domain, coherent detection enables efficient compensation of the transmission impairments by means of digital signal processing.

Differently from On-Off Keying (OOK), which conveys information using light intensity, the new modulation formats use the phase and the polarization of the transmitted signal to encode the data. This makes them sensitive to rotations of the carrier phase and of the channel polarization. The receiver must be able to distinguish between phase and polarization modulation and unintended changes induced by the dynamic nature of the transmission channel (including transmit and receive equipment). Therefore, a coherent receiver is required to compensate not only impairments as Chromatic Dispersion (CD) and Polarization Mode Dispersion (PMD), which are relevant for a direct detector as well, but also carrier frequency offset, carrier phase noise and the dynamic variations of the transfer function of the channel. It becomes therefore increasingly difficult, especially in communications systems with high data rate, to implement sophisticated compensation algorithms because of the limited speed of digital electronics.

Coherent receivers employ digital signal processing to estimate and correct all relevant transmission impairments, including carrier frequency offset, carrier phase noise, and polarization changes.

Conventional receivers for single-carrier modulation formats are described in C. R. S. Fludger, et al., "*Coherent Equalization and POLMUX-RZ-DQPSK for Robust 100-GE Transmission*", IEEE/OSA Journal of Lightwave Technology, vol. 26, no. 1, January 2008 or in M. Kuschnerov, et al., "*DSP for Coherent Single-Carrier Receivers*", IEEE/OSA Journal of Lightwave Technology, vol. 27, no. 16, August 2009. A coherent OFDM receiver is demonstrated in S. L. Jansen, et al., "*Long-Haul Transmission of 16×52.5 Gbits/s Polarization-Division-Multiplexed OFDM Enabled by MIMO Processing*", OSA J. Opt. Networking, vol. 7, no. 2, February 2008. Conventional receivers use either data-aided or blind algorithms to track phase noise and polarization changes.

For single-carrier PDM-QPSK transmission a conventional blind feed-forward carrier recovery can compensate at 1 dB excess penalty phase noise with a maximal combined normalized linewidth of:

$$\tau_s \Delta v \approx 1.6 \cdot 10^{-3} \quad (1)$$

where $\tau_s$ is the symbol period and $\Delta v$ is the sum of the full-width half-maximum linewidths of the transmit and receive local oscillator lasers (see, for example, M. G. Taylor, "*Phase Estimation Methods for Optical Coherent Detection Using Digital Signal Processing*", IEEE/OSA Journal of Lightwave Technology, vol. 27, no. 7, April 2009). For a PDM-QPSK system carrying 112 Gbit/s this results into a maximal combined linewidth of 44.8 MHz at 1 dB penalty.

For a conventional coherent OFDM system (see, for example, S. L. Jansen, et al., "*Coherent Optical 25.8-Gb/s OFDM Transmission Over 4160-km SSMF*", IEEE/OSA Journal of Lightwave Technology, vol. 26, no. 1, January 2008) the use of a low-power RF pilot tone allows transmitting 12.5 Gb/s using lasers with 5 MHz linewidth at 1 dB penalty, which is comparable to the single-carrier result, if the ratio between the bit rates is taken into account.

Both in single-carrier and OFDM systems, polarization demultiplexing can track polarization change rates ranging from a few tens to a few hundreds of krad/s (depending on the implementation).

As a result, both classes of systems are well able to compensate the phase noise generated by conventional Distributed Feed-Back (DFB) lasers and cope with mechanically induced polarization changes.

However, optical transmission systems, especially Wavelength-Division Multiplexing (WDM) long haul systems, are often operated in the nonlinear regime where nonlinear fiber effects induce fast phase and polarization changes. These depend on the signalling rate of the transmitted channels and have a broad spectrum extending up to the GHz region. Obviously such change rates exceed the tracking capability of the conventional algorithms described above and therefore cause residual phase and/or polarization misalignment, resulting into performance degradation.

The obvious solution of reducing the launch power and operating the system in the linear regime is unsatisfactory, because it implies a reduction of the regenerator-free reach.

Recently, compensation of nonlinear impairments has drawn some interest in the scientific community. Both electronic pre-compensation (see, for example, K. Roberts, et al., "*Electronic Precompensation of Optical Nonlinearity*", IEEE Photon. Technol. Lett., vol. 18, pp. 403-405, 2006) and receiver-side coherent detection with subsequent digital signal processing (see, for example, G. Goldfarb, et al., "*Experimental Demonstration of Distributed Impairment Compensation for High-Spectral Efficiency Transmission*", in Proc. Coherent Optical Technologies and Applications, Boston, Mass., p. CWB3, 2008) have been investigated.

Single channel effects, as Self Phase Modulation (SPM), can be compensated by nonlinear means on a per-channel basis. The compensation of multi-channel effects, as Cross Phase Modulation (XPM), requires the simultaneous knowledge of all affected channels. In line of principle, this could be achieved by interconnecting the relevant transponders, but, depending on network topology and wavelength routing, the interacting channels might not originate or terminate at the same site. This poses some fundamental limitations to the electronic mitigation of multi-channel effects. Equalization of single-channel effects is certainly more feasible, but also in this field the research is at an initial stage and the required implementation effort is enormous.

Polarization-time modulation for coherent optical receivers has been already investigated (see, for example, S. Mumtaz, et al., "*Space-Time Codes for Optical Fiber Communication with Polarization Multiplexing*", IEEE International Conference on Communications (ICC), May 23-27, 2010). However only non-differential polarization-time codes have been taken into consideration, which unfortunately require channel knowledge at the receiver, and introduce polarization-time diversity to contrast channel imperfections, usually Polarization Dependent Loss (PDL).

The problem to be solved is to overcome the disadvantages stated above and in particular to provide coherent receiver which can compensate not only impairments as Chromatic Dispersion (CD) and Polarization Mode Dispersion (PMD), but also carrier frequency offset, carrier phase noise and the dynamic variations of the transfer function of the channel.

SUMMARY OF THE INVENTION

In order to overcome the above-described need in the art, the present invention discloses a method comprising the steps of generating an optical signal for transmitting the sequence of information data, transmitting the sequence of information data as a sequence of transmit matrices, $S(k)$ being the k-th transmit matrix and k being a positive integer, and wherein the sequence of transmit matrices is transmitted through an optical channel characterized by a unitary channel matrix H, receiving a sequence of receive matrices, the k-th receive matrix $R(k)$ being expressed as:

$$R(k)=H \cdot S(k)+N(k)$$

wherein k is a positive integer and $N(k)$ is a complex matrix of noise samples and providing a sequence of decision matrices, the k-th decision matrix $D(k)$ being expressed as:

$$D(k)=R^H(k-1)R(k).$$

In a next embodiment of the invention, the method further includes the step of mapping the sequence of information data into a sequence of information matrices selected from an alphabet $\mathscr{C} \equiv \{Q_1, Q_2, \ldots, Q_N\}$ of N complex 2×2 unitary matrices, the k-th information matrix $Q(k)$ being a unitary matrix.

In a further embodiment, the k-th transmit matrix $S(k)$ is expressed as:

$$S(k)=S(k-1)Q(k).$$

In a next embodiment, the k-th transmit matrix $S(k)$ is expressed as:

$$S(k) = \begin{bmatrix} s_{11}(k) & s_{12}(k) \\ s_{21}(k) & s_{22}(k) \end{bmatrix}$$

wherein k is a positive integer, the symbol $s_{11}(k)$ is transmitted through a first polarization (X) and within a first time interval (2k), the symbol $s_{21}(k)$ is transmitted through a second polarization (Y) and within the first time interval (2k), the symbol $s_{12}(k)$ is transmitted through the first polarization (X) and within a second time interval (2k+1), and the symbol $s_{22}(k)$ is transmitted through the second polarization (Y) and within the second time interval (2k+1), the first (Y) and the second (Y) polarizations being orthogonal with respect to each other, the first (2k) and the second (2k+1) time intervals being subsequent time intervals, the k-th transmit matrix $S(k)$ being a unitary matrix and the symbols $s_{11}(k)$, $s_{21}(k)$, $s_{12}(k)$ and $s_{22}(k)$ being complex scalar values.

In a next embodiment of the invention, the method further includes the step of arranging the sequence of transmit matrices into a first and a second sequence of complex scalar values.

It is also an embodiment that, with respect to the k-th transmit matrix $S(k)$, the first sequence of complex scalar values includes the symbols $s_{11}(k)$ and, $s_{12}(k)$ and the second sequence of complex scalar values includes the symbols $s_{21}(k)$, and $s_{22}(k)$.

In a next embodiment of the invention, the method further includes the steps of extracting a first sequence of in-phase components ($Re\{s_{11}(k)\}$, $Re\{s_{12}(k)\}$) and a first sequence of quadrature components ($Im\{s_{11}(k)\}$, $Im\{s_{12}(k)\}$) from the first sequence of complex scalar values, and extracting a second sequence of in-phase components ($Re\{s_{21}(k)\}$, $Re\{s_{22}(k)\}$) and a second sequence of quadrature components ($Im\{s_{21}(k)\}$, $Im\{s_{22}(k)\}$) from the second sequence of complex scalar values.

In a next embodiment of the invention, the method further includes the step of estimating the sequence of information matrices, the k-th estimated matrix $\hat{Q}(k)$ being expressed as:

$$\hat{Q}(k) = \arg\min_{Q \in \mathscr{C}} \|D(k) - Q\|^2 = \arg\max_{Q \in \mathscr{C}} tr\{D^H(k) \cdot Q + Q^H D(k)\}.$$

In a further embodiment of the invention, the method further includes the steps of providing a sequence of first error matrices, the k-th first error matrix $E(k)$ being expressed as:

$$E(k) \equiv \hat{Q}(k) - D(k),$$

providing a sequence of second error matrices, the k-th second matrix $E_B(k)$ being expressed as:

$$E_B(k)=R(k-1)E(k)$$

wherein $R(k-1)$ is substantially an unitary matrix, providing polarization mode dispersion compensation by means of a polarization mode compensator including a plurality of coefficients and determining the plurality of coefficients by means of the sequence of second error matrices.

In a next embodiment of the invention, the method further includes the step of estimating the sequence of enhanced information matrices, the k-th enhanced estimated matrix $\hat{Q}_E(k)$ being expressed as:

$$\hat{Q}_E(k) = \arg\min_{Q \in \mathscr{C}} \|D_E(k) - Q\|^2 = \arg\max_{Q \in \mathscr{C}} tr\{D^H(k) \cdot Q + Q^H D_E(k)\}$$

$D_E(k)$ being the k-th enhanced decision matrix belonging to a sequence of enhanced decision matrices, $D_E(k)$ being expressed as:

$$D_E(k)=(1-\alpha) \cdot U^H(k-1) \cdot R(k)$$

$U(k)$ being the k-th reference matrix belonging to a sequence of reference matrices and $U(k)$ being expressed as:

$$U(k)=R(k)+\alpha U(k-1) \cdot \hat{Q}_E(k)$$

wherein α is a real positive scalar belonging to the interval [0; 1].

In a further embodiment of the invention, the method further includes the steps of providing a sequence of first enhanced error matrices, the k-th first enhanced error matrix $E_E(k)$ being expressed as:

$$E_E(k) = \hat{Q}_E(k) - D_E(k),$$

providing a sequence of enhanced second error matrices, the k-th enhanced second matrix $E_B(k)$ being expressed as:

$$E_{B\_E}(k) = (1-\alpha)U(k-1)E_E(k)$$

providing polarization mode dispersion compensation by means of a polarization mode compensator including a plurality of coefficients and determining the plurality of coefficients by means of the sequence of enhanced second error matrices.

In a next embodiment of the invention, the method further includes the step of determining the optimal value of the scalar α according to the conditions of the optical channel.

In a further embodiment, N(k) is a complex 2×2 matrix of noise samples expressed as $$N(k) = \begin{bmatrix} n_{11}(k) & n_{12}(k) \\ n_{21}(k) & n_{22}(k) \end{bmatrix}$$

and k is a positive integer.

The problem stated above is also solved by an apparatus for optical communication, comprising a mapper configured to map a sequence of information data into a sequence of information matrices selected from an alphabet $\mathscr{E} \equiv \{Q_1, Q_2, \ldots, Q_N\}$ of N complex 2×2 unitary matrices, the k-th information matrix Q(k) being an unitary matrix, means for generating an optical signal for transmitting the sequence of information data, a transmitter configured to transmit the sequence of information data as a sequence of transmit matrices, the k-th transmit matrix S(k) being expressed as:

$$S(k) = S(k-1)Q(k)$$

and wherein k is a positive integer, and the sequence of transmit matrices is transmitted through an optical channel characterized by a unitary channel matrix H, a receiver configured to receive a sequence of receive matrices, the k-th receive matrix R(k) being expressed as:

$$R(k) = H \sim S(k) + N(k)$$

wherein k is a positive integer and N(k) is a complex 2×2 matrix of noise samples, wherein the apparatus includes means for providing a sequence of decision matrices, the k-th decision matrix D(k) being expressed as:

$$D(k) = R^H(k-1)R(k).$$

The method and the apparatus provided, in particular, bears the following advantages:
a) they compensate not only impairments as Chromatic Dispersion (CD) and Polarization Mode Dispersion (PMD), but also carrier frequency offset, carrier phase noise and the dynamic variations of the transfer function of the channel.
b) They avoid phase and polarization tracking at all, thus completely circumventing any mismatch problem between the fast change rate of optical channel impairments and the limited processing speed of digital
c) They are easy to implement.
d) They reduce the variance of the equivalent noise.

BRIEF DESCRIPTION OF THE DRAWINGS

The invention is explained by way of example in more detail below with the aid of the attached drawings.

DESCRIPTION OF THE INVENTION

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

According to embodiments of the present invention, there is provided a method to encode the information data in the joint phase and polarization changes of the transmit signal and to recover it at the receiver by performing joint phase and polarization differential detection. The solution according to embodiments of the invention avoids phase and polarization tracking at all, thus completely circumventing any mismatch problem between the fast change rate of optical channel impairments and the limited processing speed of digital electronics.

The proposed signalling scheme according to embodiment of the inventions encodes the information in 2×2 matrices of symbols transmitted over two subsequent signalling intervals and two orthogonal polarizations. The joint use of polarization and time realizes effectively a Differential Polarization-Time (DPT) code.

Embodiments of the invention employ differential polarization-time codes with the aim of avoiding channel tracking rather than of introducing transmission diversity.

Other embodiments of the invention employ differential polarization-time codes to combat polarization and phase rotations and, accordingly, the fact that the channel matrix is unitary is particularly advantageous to obtain a novel simple decoding rule.

Other embodiments of the invention define appropriate interfaces to integrate a differential polarization-time code within a conventional optical coherent receiver capable of compensating CD and PMD.

Other embodiments of the invention employ advanced multi-symbol detection techniques tailored to the optical channel to improve joint phase and polarization differential detection and potentially close the performance gap towards fully coherent detection, depending on the dynamic characteristics of the channel.

Figure 1:
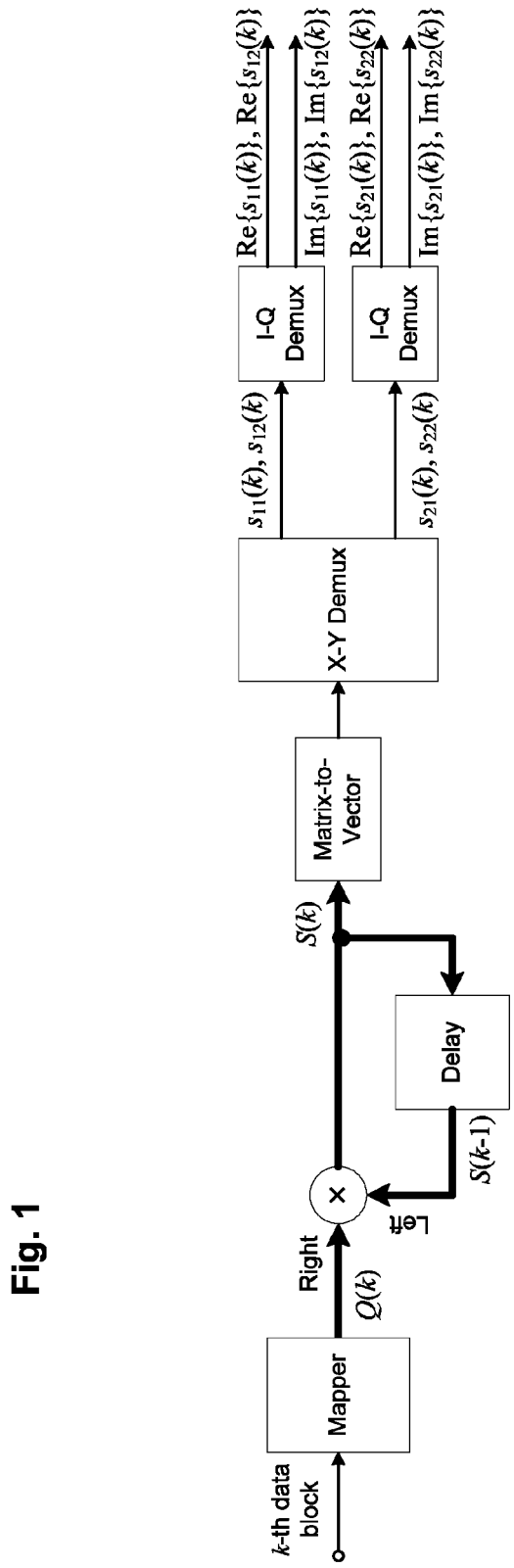
FIG. 1 illustrates the essential blocks of the differential polarization-time (DPT) transmitter according to an embodiment of the invention.

FIG. 1 illustrates the essential blocks of the differential polarization-time (DPT) transmitter according to an embodiment of the invention, including the data mapper and the differential encoder implementing the recursion (4). The terms 'Left' and 'Right' in the figure indicate the positions of the matrices in the matrix product.

The transmitter may use an alphabet C of N complex 2×2 unitary matrices $$\mathscr{C} = \{Q_1, Q_2, \ldots, Q_N\}. \quad (2)$$

The information stream can be mapped to a sequence of matrices from the alphabet C $$Q(1), Q(2), Q(3), \ldots (k=1,2,\ldots) \quad (3)$$

according to a pre-defined labelling.

The k-th transmit matrix (k=1, 2, ... ) can be obtained through the recursion $$S(k) = S(k-1)Q(k) \ (k=1,2,\ldots), \quad (4)$$

which generalizes differential encoding to unitary matrices.

The first transmit matrix S(0) can be chosen to be a complex 2×2 unitary matrix. Since every matrix Q(k) is unitary, also the k-th matrix $$S(k) = \begin{bmatrix} s_{11}(k) & s_{12}(k) \\ s_{21}(k) & s_{22}(k) \end{bmatrix} \quad (5)$$

is unitary for k=1, 2, . . . .

The complex values $s_{11}(k)$ and $s_{21}(k)$ can be transmitted over two orthogonal polarizations X and Y, respectively, at signalling time 2k and the complex values $s_{12}(k)$ and $s_{22}(k)$ can be transmitted over polarizations X and Y, respectively, at signalling time 2k+1, as illustrated below:

| Polarization X: ... | $s_{11}(k)$ | $s_{12}(k)$ | $s_{11}(k+1)$ | $s_{12}(k+1)$ | ... | (6) |
|---|---|---|---|---|---|---|
| Polarization Y: ... | $s_{21}(k)$ | $s_{22}(k)$ | $s_{21}(k+1)$ | $s_{22}(k+1)$ | ... | |
| Signalling time: ... | 2k | 2k+1 | 2k+2 | 2k+3 | ... | |

The matrix stream can be decomposed into two complex scalar streams carrying the elements of the first and the second row, respectively, which can be assigned to the X and Y polarizations. Each complex stream can be subsequently decomposed into the in-phase and quadrature components. The resulting four real streams can be possibly up-converted, spectrally shaped and modulated, according to conventional processing in an optical single-carrier transmitter.

Figure 2:
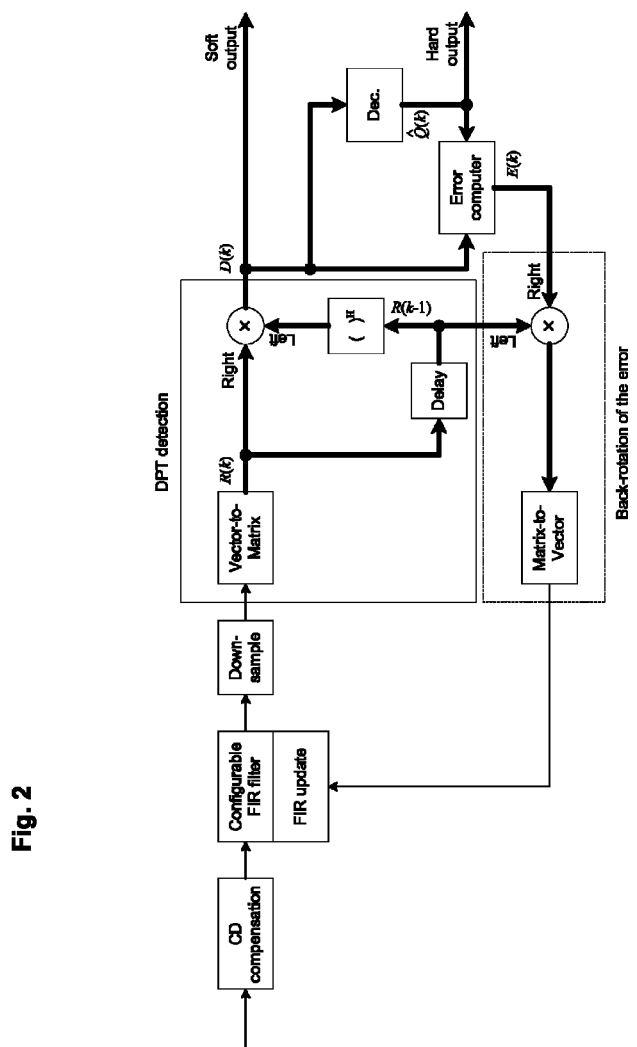
FIG. 2 illustrates the essential blocks of a receiver according to an embodiment of the invention.

FIG. 2 illustrates the essential blocks of the receiver according to an embodiment of the invention, including CD compensator, PMD compensator, DPT detector, DPT decision device, error computation and error back-rotation.

At the receiver, the in-phase and quadrature components of two orthogonal polarizations of the impinging signal can be sampled at a sufficient rate to fulfill the Nyquist sampling condition.

Bulk chromatic dispersion is compensated before and independently of DPT detection.

Subsequently, a complex butterfly filter compensates PMD and residual CD. At the output of the PMD compensator the signal can be down-sampled to one sample per symbol (i.e. 2 samples per matrix) and passed to the DPT detector.

After PMD compensation and down-sampling the received signal can be represented in matrix form as $$R(k) = H \cdot S(k) + N(k) \quad (7)$$

where H is the unitary channel matrix and $$N(k) = \begin{bmatrix} n_{11}(k) & n_{12}(k) \\ n_{21}(k) & n_{22}(k) \end{bmatrix} \quad (8)$$

is a complex 2×2 matrix of noise samples, which are assumed white, independent and normally distributed with variance $\sigma^2_n$. By virtue of the PMD compensator, the residual channel matrix H is independent of frequency and corresponds to a pure polarization/phase rotation.

The following decision variable can be defined:

$$\begin{aligned} D(k) &= R^H(k-1)R(k) \\ &= [S^H(k-1)H^H + N^H(k-1)] \cdot \\ &\quad [H \cdot S(k-1)Q(k) + N(k)], \\ &= Q(k) + N_1(k) + N_2(k) + N^H(k-1)N(k) \end{aligned} \quad (9)$$

where $$N_1(k) \equiv S^H(k-1)H^H N(k) \quad (10)$$

and $$N_2(k) \equiv N^H(k-1)H \cdot S(k). \quad (11)$$

And $()^H$ is the Hermitian transpose operator. The noise terms $N_1$ and $N_2$ can be obtained by a unitary transformation of the original noise process and, therefore, have its same statistical properties. By neglecting the quadratic noise term $N^H N$ it is possible to obtain $$D(k) \approx Q(k) + N'(k), \quad (12)$$

where the effective noise $$N'(k) = N_1(k) + N_2(k) \quad (13)$$

has white, independent, normally distributed components with variance $2\sigma^2_n$. It is worthwhile to observe that differential polarization-time detection can cause an increase of the effective noise power by a factor 2.

The detection rule to be implemented in the decision device follows from (11):

$$\hat{Q}(k) = \arg\min_{Q \in \mathscr{C}} \|D(k) - Q\|^2 = \arg\max_{Q \in \mathscr{C}} tr\{D^H(k) \cdot Q + Q^H D(k)\}. \quad (14)$$

DPT detection is a nonlinear operation and should be preferably performed after PMD compensation to preserve the linear mapping of channel impairments into the electrical domain. This may pose the problem of computing the adaptation criterion for the PMD compensator whose output is only partially demodulated.

The error due to noise and misalignment of the PMD compensator can be defined as follows:

$$E(k) \equiv \hat{Q}(k) - D(k). \quad (15)$$

And can be related to the error $E_B(k)$ before DPT detection by:

$$E(k) = R^H(k-1)E_B(k). \quad (16)$$

If the noise term in (7) is regarded as a perturbation, then the term R(k−1) can be regarded approximately as a unitary matrix and the term $E_B(k)$ can be computed from the error E(k) by simple back-rotation $$E_B(k) = (R^H(k-1))^{-1}E(k) \approx R(k-1)E(k) \quad (17)$$

The error matrix $E_B(k)$ can be decomposed into its scalar entries and used in a conventional stochastic gradient algorithm to adapt the coefficients of the PMD compensator.

Differential detection is insensitive to phase and polarization rotations of the channel transfer function as long as their speed is negligible with respect to the time necessary to transmit two consecutive matrices $S(k-1)$ and $S(k)$, i.e. four consecutive symbols. Cancelling the fast rotations can relieve the PMD compensator from the task of polarization de-multiplexing. Error back-rotation can make DPT transparent to the adaptation algorithm of the PMD compensator.

Since the signalling rate in an optical system can be as high as a few tens of GHz, DPT systems can cope with polarization change rates of a few Grad/s. As a term of comparison, it is worthwhile to observe that state-of-the-art coherent receiver can track polarization change rates ranging from a few tens to a few hundreds of krad/s.

It has been observed above that differential detection suffers from an enhancement of the effective noise power by a factor 2 with respect to coherent detection. This ma be due to the fact that both the current matrix $R(k)$ and the reference matrix $R(k-1)$ are noisy.

Figure 3:
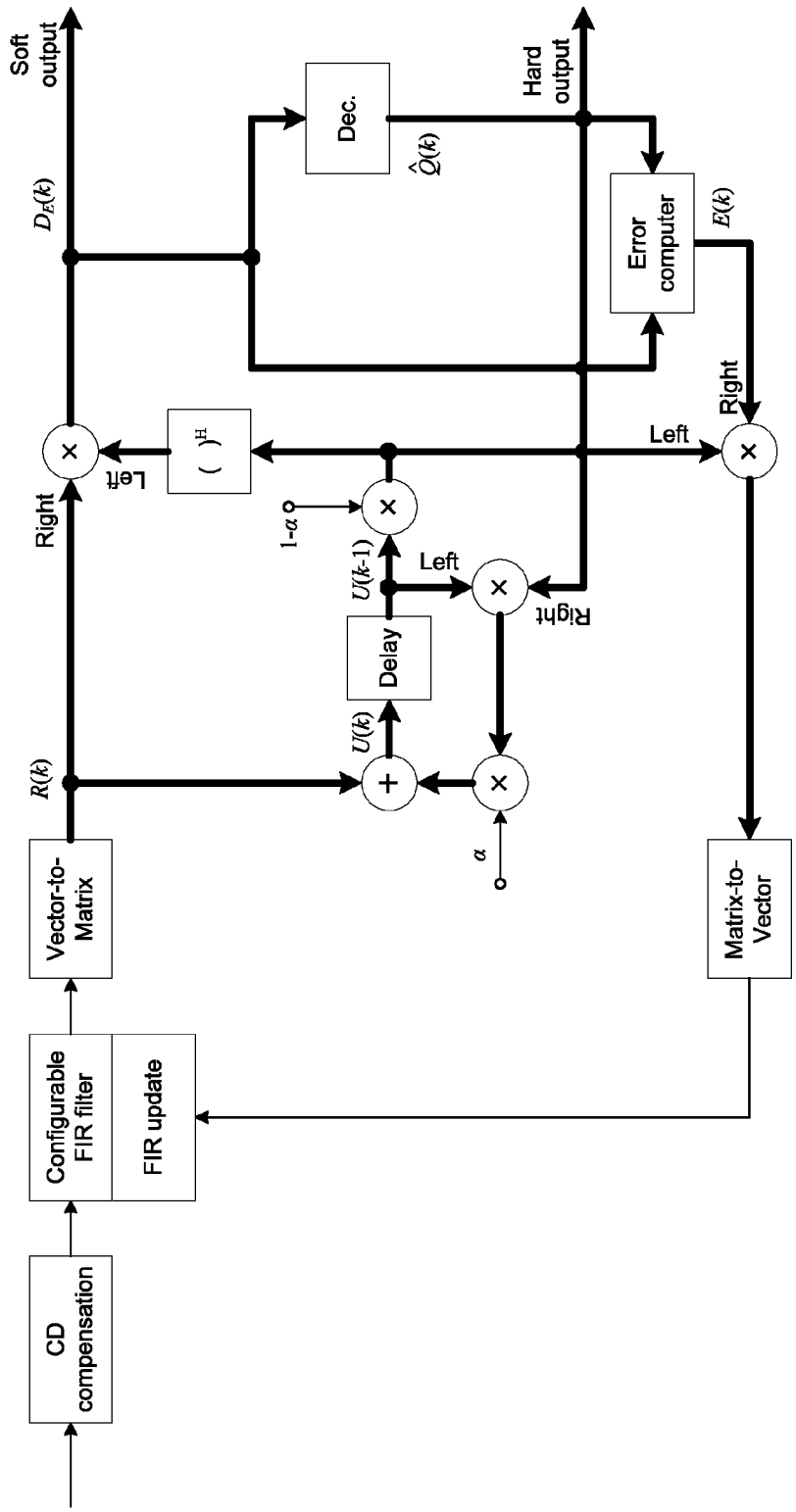
FIG. 3 illustrates a DPT receiver using enhanced DPT detection according to one embodiment of the invention.

FIG. 3 illustrates a DPT receiver using enhanced DPT detection according to one embodiment of the invention.

In the present embodiment of the invention an improved multi-symbol detection technique is provided that reduces the effective noise by averaging the reference over multiple matrices.

In detail, the enhanced reference matrix $U(k)$ is averaged through the recursion $$U(k) = R(k) + \alpha U(k-1) \cdot \hat{Q}(k), \tag{18}$$

where $\alpha$ is a real positive scalar constant belonging to the interval [0; 1]. The enhanced decision variable is $$D_E(k) = (1-\alpha) \cdot U^H(k-1) \cdot R(k). \tag{19}$$

For $\alpha=0$, as a special case, the decision variable defined in (9) is obtained.

The recursion can be unrolled as follows:

$$\begin{aligned} D_E(k) &= (1-\alpha) \cdot \left[ R^H(k-1) + \alpha \hat{Q}^H(k-1) U^H(k-2) \right] \cdot R(k) \\ &= (1-\alpha) \cdot \left[ R^H(k-1) + \alpha \hat{Q}^H(k-1) R^H(k-2) + \right. \\ &\quad \left. \alpha^2 \hat{Q}^H(k-1) \hat{Q}^H(k-2) U^H(k-3) \right] \cdot R(k) \\ &= (1-\alpha) \cdot \sum_{m=1}^{k} \alpha^{m-1} \left[ \prod_{n=1}^{m-1} \hat{Q}^H(k-n) \right] R^H(k-m) \cdot R(k) \end{aligned} \tag{20}$$

By using (4) it is possible to get:

$$\begin{aligned} S(k-1) &= S(k-2) Q(k-1) \\ &= S(k-3) Q(k-2) Q(k-1) \\ &= S(k-n) \prod_{p=m-1}^{1} Q(k-p) \end{aligned} \tag{21}$$

and, therefore, $$S(k-n) = S(k-1) \prod_{p=1}^{m-1} Q^H(k-p). \tag{22}$$

Substituting this result in (20) and with the use of (7) it is possible to obtain:

$$D_E(k) = (1-\alpha) \cdot \sum_{m=1}^{k} \alpha^{m-1} \left[ \prod_{n=1}^{m-1} \hat{Q}^H(k-n) \right] \tag{23}$$

$$\left[ \prod_{p=m-1}^{1} Q(k-p) S^H(k-1) H^H + N^H(k-m) \right] \cdot R(k).$$

If, for simplicity's sake, it is assumed that all past decisions are correct, i.e.

$$\hat{Q}(k-n) = Q(k-n) \quad (k=1,2,\ldots,k-1) \tag{24}$$

it is possible to get:

$$D_E(k) = \tag{25}$$

$$(1-\alpha) \cdot \sum_{m=1}^{k} \alpha^{m-1} [S^H(k-1) H^H + N_{eq}(k,m)] \cdot [H \cdot S(k) + N(k)],$$

where $$N_{eq}(k,m) \equiv \prod_{n=1}^{m-1} \hat{Q}^H(k-n) N^H(k-m) \tag{26}$$

has the same statistic properties of the original noise process.

With the use of (10) and with the definition $$N_{2,eq}(k,m) \equiv N_{eq}(k,m) H \cdot S(k) \tag{27}$$

we finally obtain:

$$\begin{aligned} D_E(k) &= (1-\alpha) \cdot \sum_{m=1}^{k} \alpha^{m-1} [S^H(k-1) S(k) + S^H(k-1) H^H N(k) + \\ &\quad N_{eq}(k,m) \cdot H \cdot S(k) + N_{eq}(k,m) N(k)] \\ &= (1-\alpha) \cdot \sum_{m=1}^{k} \alpha^{m-1} [Q(k) + N_1(k) + N_{eq}(k,m) \cdot H \cdot S(k) + \\ &\quad N_{eq}(k,m) \cdot N(k)] \\ &= (1-\alpha^k) \cdot [Q(k) + N_1(k)] + (1-\alpha) \cdot \sum_{m=1}^{k} \alpha^{m-1} \\ &\quad [N_{2,eq}(k,m) + N_{eq}(k,m) \cdot N(k)] \\ &\cong Q(k) + N_1(k) + (1-\alpha) \cdot \sum_{m=1}^{k} \alpha^{m-1} N_{2,eq}(k,m), \end{aligned} \tag{28}$$

where it is assumed $\alpha > 0$, the quadratic noise term has been neglected and k has been let diverge. This shows that the noise terms $N_2$ in the enhanced decision variable are averaged over the previously received matrices by an exponentially decaying window.

The scalar $\alpha$ controls the memory of the averaging process. Large values of $\alpha$ correspond to longer averaging and therefore improve the noise resilience at the expense of the sensitivity to fast polarization and phase rotations. The optimal value of $\alpha$ depends on the ratio between additive Gaussian noise and polarization/phase noise. A practical implementation can use a configurable forgetting factor that can be tuned according to the actual channel conditions.

According to (12), the error probability in an optical polarization-time modulation is determined by the Euclidean distance between the matrices of the codebook $\mathscr{C}$. To attain high spectral efficiency and good noise resilience, it is possible to maximize the order and (in a first order approximation) the minimum Euclidean distance of the DPT constellation.

In the following the potential of the technique is illustrated using both alphabets with and without group structure.

As a first example the following group alphabet is considered:

$$\mathscr{C} = \langle G_1, G_2, G_3 \rangle, \tag{29}$$

generated by the matrices $$G_1 = \begin{bmatrix} \exp\left(j\frac{2\pi}{M_1}\right) & 0 \\ 0 & \exp\left(j\frac{2\pi}{M_1}\right) \end{bmatrix}, \tag{30}$$

$$G_2 = \begin{bmatrix} \cos\left(\frac{2\pi}{M_2}\right) & -\sin\left(\frac{2\pi}{M_2}\right) \\ \sin\left(\frac{2\pi}{M_2}\right) & \cos\left(\frac{2\pi}{M_2}\right) \end{bmatrix} \tag{31}$$

and $$G_3 = \begin{bmatrix} 0 & 1 \\ 1 & 0 \end{bmatrix}. \tag{32}$$

For $M_1=M_2=8$ $\mathscr{C}$ has order 64 and minimum squared Euclidean distance $8\cdot\sin^2(\pi/8)\approx 1.17$. The use of a group alphabet can simplify the implementation of differential encoding at the transmitter. Since both S(k) and S(k−1) in the recursion (4) belong to a coset of $\mathscr{C}$, the multiplication can be implemented by a look-up table.

Figure 4:
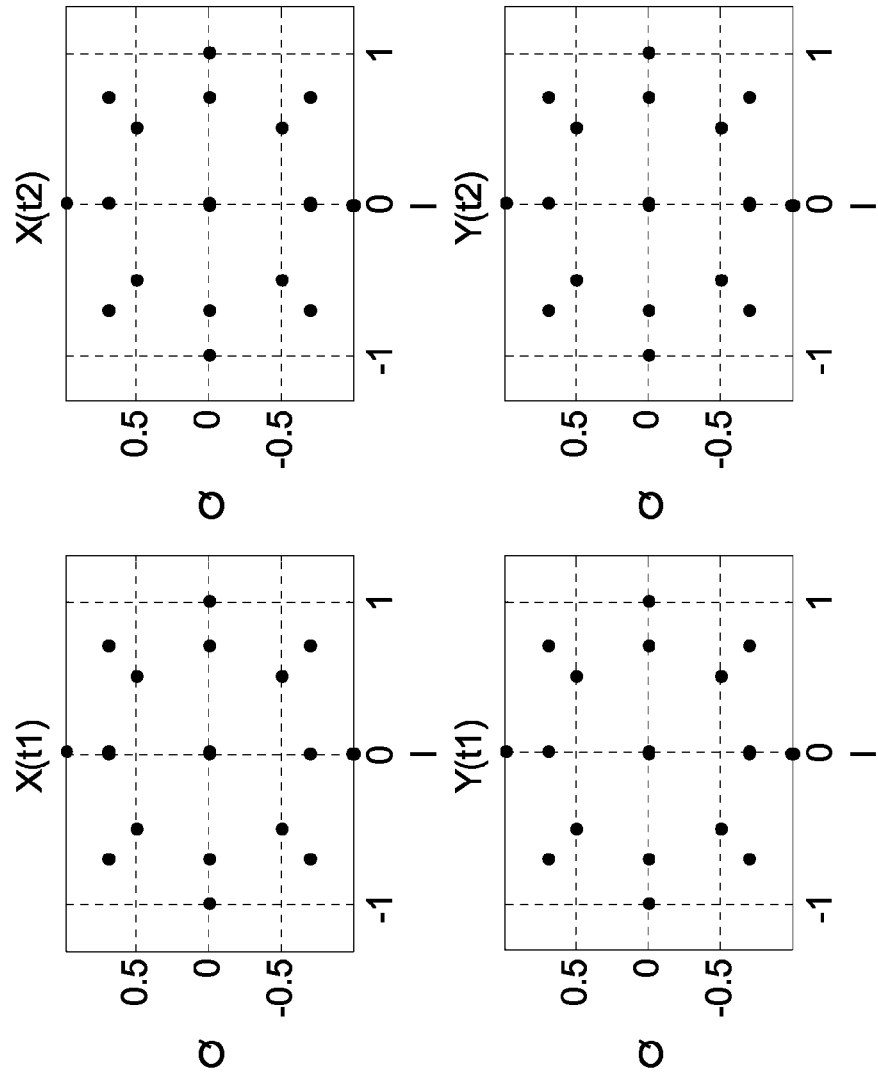
FIG. 4 shows the projection of the transmit signal (for the case that S(0) is the identity matrix) on the component complex constellations according to one embodiment of the invention.

FIG. 4 shows the projection of the transmit signal (for the case that is the identity matrix) on the component complex constellations according to one embodiment of the invention.

As a second example the alphabet of the following unitary matrices is considered:

$$\begin{bmatrix} \exp\left(j\frac{2\pi \cdot m_1}{M_1}\right)\cos\left(\frac{2\pi \cdot m_4}{M_4}+\varphi_0\right) & -\exp\left(j\frac{2\pi \cdot m_2}{M_2}\right)\exp\left(j\frac{2\pi \cdot m_3}{M_3}\right)\sin\left(\frac{2\pi \cdot m_4}{M_4}+\varphi_0\right) \\ \exp\left(j\frac{2\pi \cdot m_2}{M_2}\right)\sin\left(\frac{2\pi \cdot m_4}{M_4}+\varphi_0\right) & \exp\left(j\frac{2\pi \cdot m_1}{M_1}\right)\exp\left(j\frac{2\pi \cdot m_3}{M_3}\right)\cos\left(\frac{2\pi \cdot m_4}{M_4}+\varphi_0\right) \end{bmatrix}, \tag{33}$$

with $$\begin{aligned} m_1 &\in \{0, 1, \ldots, M_1-1\} \\ m_2 &\in \{0, 1, \ldots, M_2-1\} \\ m_3 &\in \{0, 1, \ldots, M_3-1\} \\ m_4 &\in \{0, 1, \ldots, M_4-1\}. \end{aligned} \tag{34}$$

For $M_1=M_2=M_3=4$, $M_4=1$ and $\varphi_0=\pi/4$, an alphabet of order 64 with minimum squared Euclidean distance 2 is obtained.

Although the alphabet is not a group and does not fulfill the closure property under matrix multiplication, the four transmit constellations consists of (identical) finite sets of discrete points. Therefore, similarly to the first also in this case differential encoding can be implemented through a look-up table.

Figure 5:
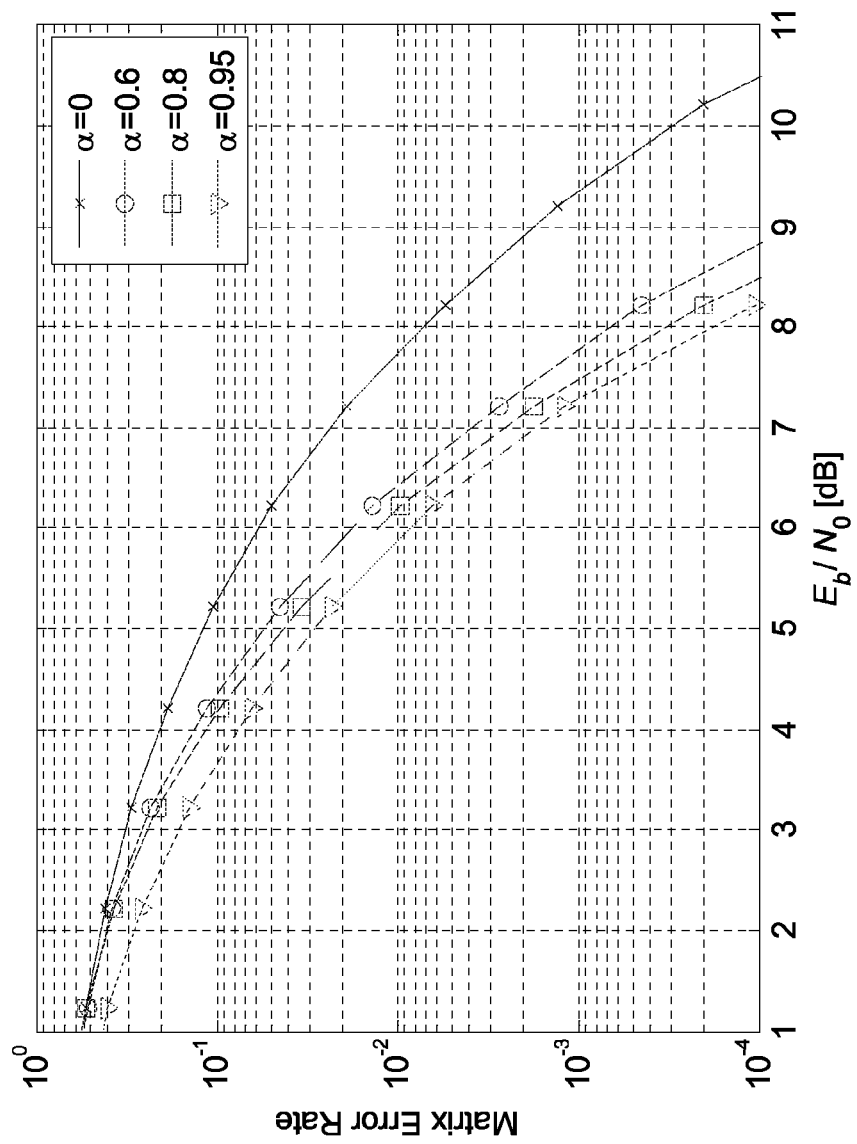
FIG. 5 shows the simulated matrix error rate over the Additive White Gaussian Noise (AWGN) channel as a function of the ratio between energy per bit $E_b$ and variance $N_0$ of the complex I/Q noise samples according to one embodiment of the invention.

FIG. 5 shows the simulated matrix error rate over the Additive White Gaussian Noise (AWGN) channel as a function of the ratio between energy per bit $E_b$ and variance $N_0$ of the complex I/Q noise samples according to one embodiment of the invention. As expected, higher values of a correspond to a better performance under static channel conditions. The bit error rate depends on the mapping between bits and orthogonal matrices.

Figure 6:
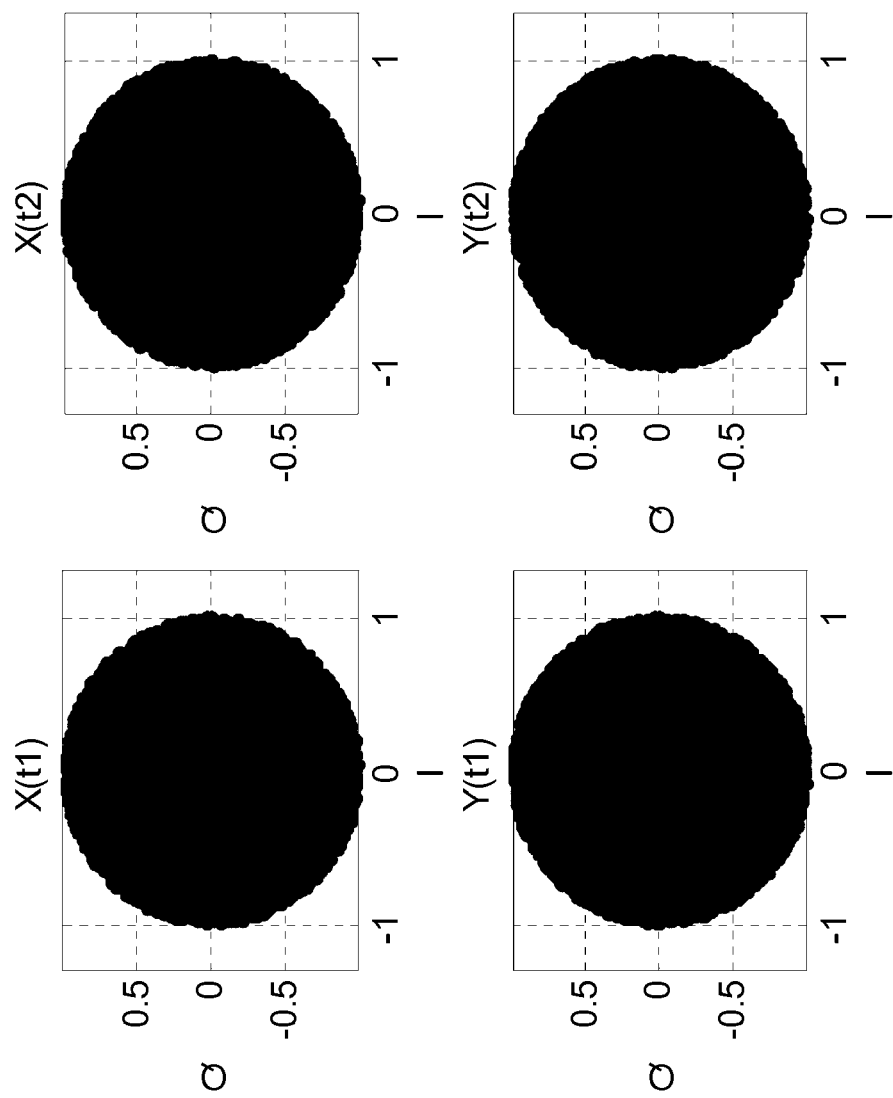
FIG. 6 shows the projection of the transmit signal on the component I/Q constellations according to an embodiment of the invention.

FIG. 6 shows the projection of the transmit signal on the component I/Q constellations according to an embodiment of the invention. As an example, with the parameterisation, for $M_1=M_2=M_3=M_4=4$ and $\varphi_0=0.464$, after expurgating the duplicated matrices, it is possible to obtain an alphabet of order 128 with minimum squared Euclidean distance ~0.798. In this case, as illustrated in FIG. 6, the four transmit constellations are continuous and infinite and differential encoding requires a full matrix multiplication.

The present invention is not limited to the details of the above described principles. The scope of the invention is defined by the appended claims and all changes and modifications as fall within the equivalents of the scope of the claims are therefore to be embraced by the invention. Mathematical conversions or equivalent calculations of the signal values based on the inventive method or the use of analogue signals instead of digital values are also incorporated.

LIST OF ABBREVIATIONS

AWGN Additive White Gaussian Noise
CD Chromatic Dispersion
CMA Constant Modulus Algorithm
DFB Distributed Feed-Back
DGD Differential Group Delay
DPT Differential Polarization-Time
I/Q In-phase/Quadrature
LMS Least Mean Square
OFDM Orthogonal Frequency-Division Multiplexing
OOK On-Off Keying
PDM Polarization Division Multiplexing
PMD Polarization Mode Dispersion
PSK Phase-Shift Keying
QPSK Quaternary Phase-Shift Keying
SPM Self Phase Modulation
WDM Wavelength-Division Multiplexing
XPM Cross Phase Modulation

The invention claimed is:

1. An optical communication method, comprising
generating an optical signal for transmitting a sequence of information data;
mapping the sequence of information data into a sequence of information matrices selected from an alphabet $\mathscr{C} = \{Q_1, Q_2, \ldots, Q_N\}$ of N complex 2×2 unitary matrices, a k-th one of the information matrices, Q(k), being a unitary matrix, and k being a positive integer;
encoding the sequence of information matrices in a sequence of transmit matrices, wherein a k-th one of the transmit matrices, S(k), is expressed as:

$$S(k)=S(k-1)Q(k)$$

transmitting the transmit matrices through an optical channel characterized by a unitary channel matrix H;

receiving a sequence of receive matrices, a k-th one of the receive matrices, R(k), being expressed as:

$$R(k)=H \cdot S(k)+N(k)$$

wherein N(k) is a complex matrix of noise samples;
characterized by;
providing a sequence of decision matrices, a k-th one of the decision matrices, D(k), being expressed as:

$$D(k)=R^H(k-1)R(k);$$

and
estimating the k-th information matrix by selecting from the alphabet $\mathscr{C}$ the information matrix having the smallest distance measure to the k-th decision matrix D(k).

2. A method according to claim 1, the k-th transmit matrix S(k) being expressed as:

$$S(k) = \begin{bmatrix} s_{11}(k) & s_{12}(k) \\ s_{21}(k) & s_{22}(k) \end{bmatrix}$$

wherein k is a positive integer, $s_{11}(k)$ is a symbol that is transmitted through a first polarization (X) and within a first time interval (2k), $s_{21}(k)$ is a symbol that is transmitted through a second polarization (Y) and within the first time interval (2k), $s_{12}(k)$ is a symbol that is transmitted through the first polarization (X) and within a second time interval (2k+1), and $s_{22}(k)$ is a symbol that is transmitted through the second polarization (Y) and within the second time interval (2k+1);
the first (X) and the second (Y) polarizations being orthogonal with respect to each other; the first (2k) and the second (2k+1) time intervals being subsequent time intervals;
the k-th transmit matrix S(k) being a unitary matrix;
the symbols $s_{11}(k)$, $s_{21}(k)$, $s_{12}(k)$ and $s_{22}(k)$ being complex scalar values.

3. A method according to claim 2, further comprising:
arranging the sequence of transmit matrices into a first and a second sequence of complex scalar values.

4. A method according to claim 3, wherein with respect to the k-th transmit matrix S(k), the first sequence of complex scalar values includes the symbols $s_{11}(k)$ and, $s_{12}(k)$ and the second sequence of complex scalar values includes the symbols $s_{21}(k)$ and $s_{22}(k)$.

5. A method according to claim 4, further comprising:
extracting a first sequence of in-phase components ($\text{Re}\{s_{11}(k)\}$, $\text{Re}\{s_{12}(k)\}$) and a first sequence of quadrature components ($\text{Im}\{s_{11}(k)\}$, $\text{Im}\{s_{12}(k)\}$) from the first sequence of complex scalar values; and
extracting a second sequence of in-phase components ($\text{Re}\{s_{21}(k)\}$, $\text{Re}\{s_{22}(k)\}$) and a second sequence of quadrature components ($\text{Im}\{s_{21}(k)\}$, $\text{Im}\{s_{22}(k)\}$) from the second sequence of complex scalar values.

6. A method according to claim 1, further comprising:
estimating the sequence of information matrices, the k-th estimated matrix $\hat{Q}(k)$ being expressed as $$\hat{Q}(k) = \arg\min_{Q \in \mathscr{C}} \|D(k) - Q\|^2$$
$$= \arg\max_{Q \in \mathscr{C}} tr\{D^H(k) \cdot Q + Q^H D(k)\}.$$

7. A method according to claim 6, further comprising:
providing a sequence of first error matrices, the k-th first error matrix E(k) being expressed as:

$$E(k)\equiv\hat{Q}(k)-D(k);$$

providing a sequence of second error matrices, the k-th s error matrix $E_B(k)$ being expressed as:

$$E_B(k)=R(k-1)E(k);$$

providing polarization mode dispersion compensation by means of a polarization mode compensator including a plurality of coefficients;
determining the plurality of coefficients by means of the sequence of second error matrices.

8. A method according to claim 1, further comprising:
estimating a sequence of enhanced information matrices, the k-th enhanced estimated matrix $\hat{Q}_E(k)$ being expressed as:

$$\hat{Q}_E(k) = \arg\min_{Q \in \mathscr{C}} \|D_E(k) - Q\|^2 = \arg\max_{Q \in \mathscr{C}} tr\{D^H(k) \cdot Q + Q^H D_E(k)\}$$

$D_E(k)$ being a k-th enhanced decision matrix belonging to a sequence of enhanced decision matrices, $D_E(k)$ being expressed as:

$$D_E(k)=(1-\alpha) \cdot U^H(k-1) \cdot R(k)$$

U(k) being a k-th reference matrix belonging to a sequence of reference matrices, U(k) being expressed as:

$$U(k)=R(k)+\alpha U(k-1) \cdot \hat{Q}_E(k)$$

wherein $\alpha$ is a real positive scalar belonging to an interval [0; 1].

9. A method according to claim 8, further comprising:
providing a sequence of first enhanced error matrices, the k-th first enhanced error matrix $E_E(k)$ being expressed as:

$$E_E(k)\equiv\hat{Q}_E(k)-D_E(k);$$

providing a sequence of enhanced second error matrices, the k-th enhanced second error matrix $E_B(k)$ being expressed as:

$$E_{B_E}(k)=(1-\alpha)U(k-1)E_E(k)$$

providing polarization mode dispersion compensation by means of a polarization mode compensator including a plurality of coefficients;
determining the plurality of coefficients by means of the sequence of enhanced second error matrices.

10. A method according to claim 8, further comprising:
determining an optimal value of the scalar $\alpha$ according to conditions of an optical channel.

11. A method according to claim 1, wherein N(k) is a complex 2×2 matrix of noise samples expressed as $$N(k) = \begin{bmatrix} n_{11}(k) & n_{12}(k) \\ n_{21}(k) & n_{22}(k) \end{bmatrix}$$

and k is a positive integer.

12. An apparatus for optical communication, comprising
a receiver configured to receive a sequence of receive matrices via an optical channel characterized by an unitary channel matrix H, a k-th of the receive matrices, R(k), being expressed as:

$$R(k)=H \cdot S(k)+N(k)$$

wherein k is a positive integer, N(k) is a complex 2×2 matrix of noise samples, S(k) is a transmit matrix where S(k)=S(k−1)Q(k) and Q(k) is a k-th information matrix selected from an alphabet $\mathscr{C} \equiv \{Q_1, Q_2, \ldots, Q_N\}$ of unitary 2×2 matrices into which information data has been mapped for transmission;

characterized in that:

the apparatus includes means for providing a sequence of decision matrices, a k-th one of the decision matrices D(k), being expressed as:

$D(k)=R^H(k-1)R(k)$; and means for estimating the k-th information matrix by selecting from the alphabet $\mathscr{C}$ the information matrix which has the smallest distance measure to the k-th decision matrix D(k).

13. An optical communication method, comprising receiving a sequence of receive matrices via an optical channel characterized by a unitary matrix H, where R(k) is a k-th one of the receive matrices and k is a positive integer, wherein the sequence of transmit matrices into which is mapped a sequence of information and which is provided to an optical channel result from differential encoding with unitary matrices Q(k) selected from an alphabet $\mathscr{C}$ of complex 2×2 unitary matrices;

providing a sequence of decision matrices, a k-th of the decision matrices being expressed as:

$D(k)=R^H(k-1)R(k)$; and estimating the k-th information matrix by selecting from the alphabet $\mathscr{C}$ the information matrix having the smallest distance measure to the k-th decision matrix D(k).

\* \* \* \* \*